(12) United States Patent
Leum

(10) Patent No.: US 9,051,136 B2
(45) Date of Patent: Jun. 9, 2015

(54) MOBILE LOADING DOCK WITH ADJUSTABLE LEG ASSEMBLY

(71) Applicant: Grant Leum, Excelsior, MN (US)

(72) Inventor: Grant Leum, Excelsior, MN (US)

(*) Notice: Subject to any disclaimer, the term of this patent is extended or adjusted under 35 U.S.C. 154(b) by 20 days.

(21) Appl. No.: 14/076,628

(22) Filed: Nov. 11, 2013

(65) Prior Publication Data

US 2015/0128360 A1 May 14, 2015

(51) Int. Cl.
*E01F 1/00* (2006.01)
*B65G 69/28* (2006.01)
*B65G 69/30* (2006.01)
*A61G 3/06* (2006.01)

(52) U.S. Cl.
CPC .............. *B65G 69/287* (2013.01); *B65G 69/30* (2013.01); *A61G 3/061* (2013.01)

(58) Field of Classification Search
CPC ......... B65G 69/30; A61G 3/061; B66F 7/243
USPC ......................................... 14/69.5, 71.3–72.5
See application file for complete search history.

(56) References Cited

U.S. PATENT DOCUMENTS

| | | | |
|---|---|---|---|
| 3,548,433 A | 12/1970 | Miles et al. | |
| 3,802,018 A | 4/1974 | Miles et al. | |
| 4,201,157 A * | 5/1980 | Lambert | 119/752 |
| 4,270,630 A * | 6/1981 | Karkau | 187/200 |
| 4,624,446 A | 11/1986 | Gould | |
| 4,765,792 A | 8/1988 | Cherry et al. | |
| 5,311,628 A | 5/1994 | Springer et al. | |
| 5,845,356 A | 12/1998 | Kielinski | |
| 6,164,415 A * | 12/2000 | Takeuchi et al. | 187/224 |
| 6,898,815 B2 * | 5/2005 | Young et al. | 14/69.5 |
| 6,931,686 B2 | 8/2005 | Hoofard et al. | |
| 7,013,519 B2 | 3/2006 | Gleason | |
| 7,062,813 B2 | 6/2006 | Hoofard et al. | |
| 7,216,392 B2 | 5/2007 | Hoofard et al. | |
| 8,832,890 B2 * | 9/2014 | Loftis et al. | 14/2.4 |

(Continued)

FOREIGN PATENT DOCUMENTS

| | | |
|---|---|---|
| CN | 203 729 856 U | 7/2014 |
| DE | 19 46 083 A1 | 3/1971 |

(Continued)

OTHER PUBLICATIONS

Amitengineering. Movable Dock Ramp. YouTube, published on Nov. 2, 2012; Retrieved form the Internet on May 9, 2014, URL: http://www.youtube.com/watch?v=NPPd90-8a1g.

(Continued)

*Primary Examiner* — Raymond W Addie
(74) *Attorney, Agent, or Firm* — Jansson Munger McKinley and Shape Ltd.

(57) ABSTRACT

An adjustable leg assembly for a loading dock ramp member having an elongate, adjustable housing with incremental slots, a hydraulic system having a hydraulic pump with a cylinder fully contained within the housing and a handle for operation of the hydraulic system. The leg assembly also includes a lock bracket for insertion into the slots to contact the cylinder for even distribution of compression loads. A user pumps the handle to actuate the hydraulic system and thereby adjust the loading dock to the desired height.

8 Claims, 4 Drawing Sheets

(56) References Cited

U.S. PATENT DOCUMENTS

| | | | | |
|---|---|---|---|---|
| 2002/0170785 | A1* | 11/2002 | Stockmann | 187/275 |
| 2004/0250360 | A1 | 12/2004 | Young et al. | |
| 2006/0081756 | A1* | 4/2006 | Hallett | 248/371 |
| 2006/0082079 | A1* | 4/2006 | Eichhorn et al. | 280/6.155 |
| 2012/0048653 | A1* | 3/2012 | Matthews et al. | 187/211 |
| 2012/0121369 | A1* | 5/2012 | Ablabutyan | 414/540 |
| 2014/0109944 | A1* | 4/2014 | Triolo et al. | 135/67 |

FOREIGN PATENT DOCUMENTS

| | | |
|---|---|---|
| DE | 196 30 359 A1 | 1/1998 |
| FR | 2 547 566 A1 | 12/1984 |
| FR | 2 777 342 A1 | 10/1999 |

OTHER PUBLICATIONS

Leumengineering. Mobile Loading Dock—How It Works. YouTube, published on Jun. 14, 2013; Retrieved from the Internet on May 9, 2014, URL: https://www.youtube.com/watch?v=kyvwWLhSQqo.
English language machine translation of Abstract, DE 196 30 359, Blomenroehr Fahrzeugbau GmbH, Jan. 29, 1998.
English language machine translation of Abstract, FR 2 547 566, Crepin, Dec. 21, 1984.
English language machine translation of Abstract, CN 203 729 856, Lu, Jul. 23, 2014.
English language machine translation of Abstract, FR 2 777 342, Philippeau, Oct. 15, 1999.
English language machine translation of Abstract, DE 19 46 083, Klink, Mar. 18, 1971.

* cited by examiner

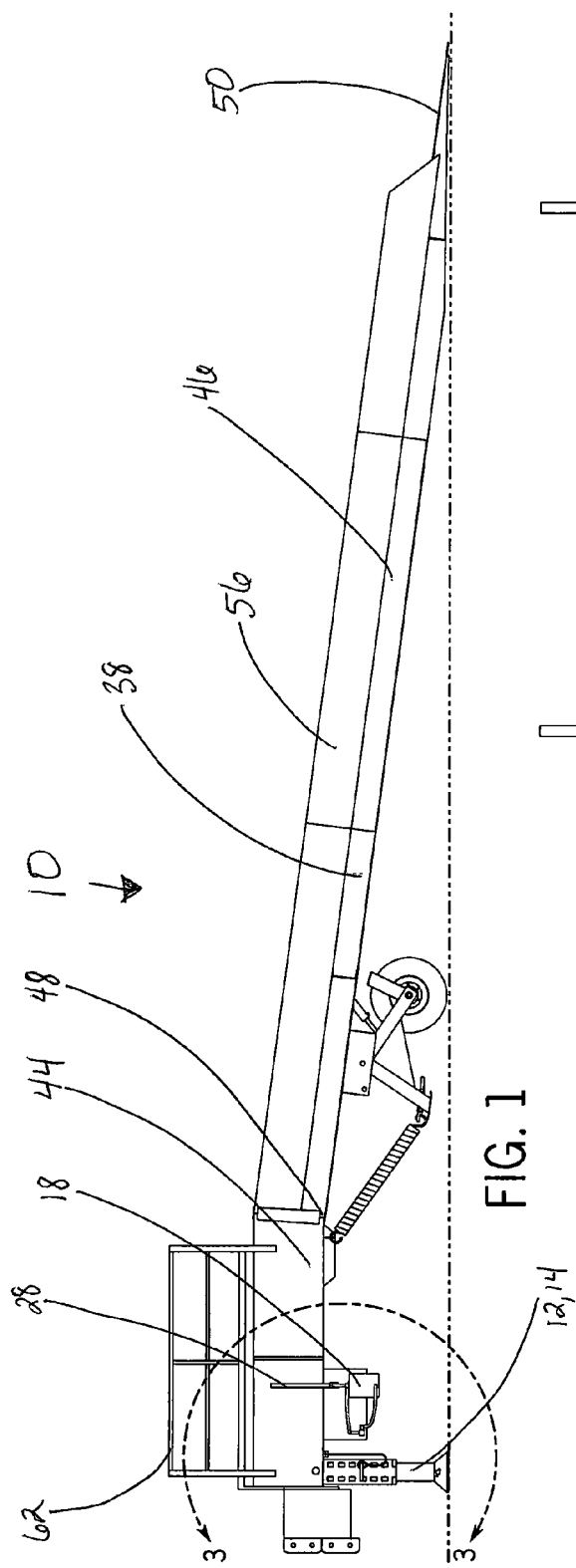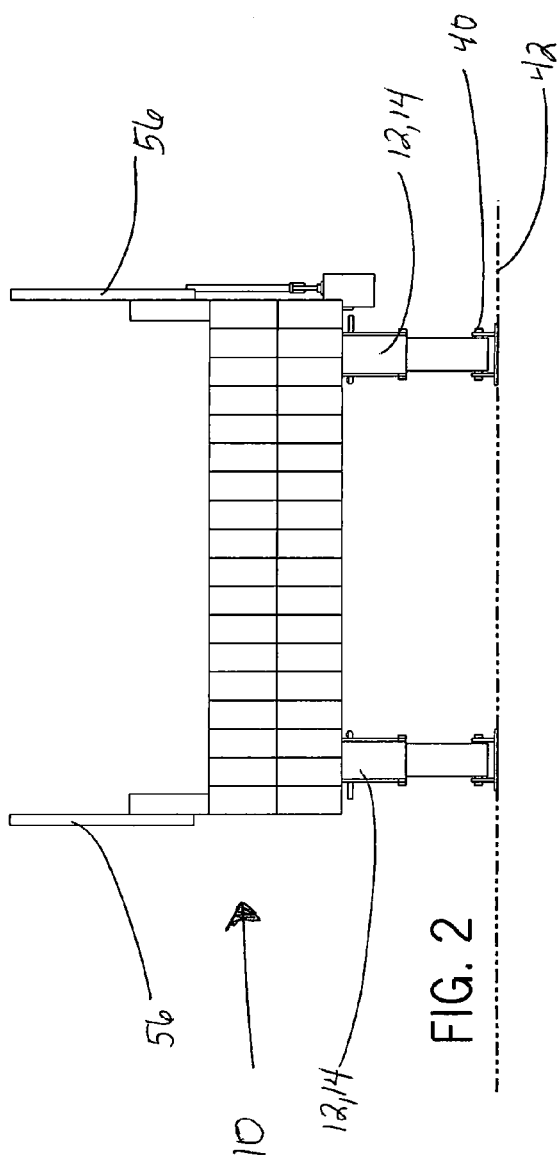

MOBILE LOADING DOCK WITH ADJUSTABLE LEG ASSEMBLY

FIELD

This device relates to mobile loading docks and more particularly to a loading dock having an adjustable leg assembly for adjustment and positioning of a dock.

BACKGROUND

A variety of loading docks have been devised to adjust to the height of different trailers to properly match the deck of the trailer to the height of the dock. By aligning the height of the trailer and the dock the loading and unloading of cargo is facilitated.

There are many such devices in the prior art. One such device is seen in U.S. Pat. No. 4,624,446 to Gould which discloses a reinforced platform pivotally mounted to the ground at one end and includes a support assembly having hydraulic cylinders. In operation the rear wheels of a truck trailer are backed onto the platform and then the non-mounted end of the platform is lifted by the hydraulic cylinders until the deck of the trailer is equal to the height of the dock. A similar device is disclosed in U.S. Pat. No. 4,765,792 to Cherry, et al. which also discloses a pivotally-mounted and hydraulically-raised platform.

Loading docks of the prior art typically have certain disadvantages. One such disadvantage is that the majority of moveable loading docks require the use of two manually adjustable support legs. Such supports are typically landing gear and consist of gear screw mechanisms which are manually cranked to adjust the height of the front of the dock so that it is flush with the trailer for loading and unloading of material. Typically, it is very cumbersome to manually adjust the height of the dock the twelve inches or more needed for the loading dock to reach the height of the trailer. Furthermore, this manual operation requires a fork truck operator or other individual to manually crank both support legs to the appropriate height. This is a very time consuming process which may even take more than one individual to execute.

It would be desirable to have a mobile loading dock with an adjustable leg assembly that is able to be adjusted to the height of a trailer without the need for a gear screw mechanism that is cumbersome to both crank and adjust. It would also be desirable to provide an adjustable leg assembly for a loading dock which is secure and safe and which also allows for easy maneuvering of the loading dock.

This device overcomes certain problems and shortcomings in the prior art, including those mentioned above and others, and provides advantages for an adjustable leg assembly for mobile loading dock not previously provided.

SUMMARY

This device is an improvement in an adjustable leg assembly for a loading dock ramp member of the type having an elongate, adjustable housing including incremental slots, a hydraulic system having a hydraulic pump with a relief valve and check valve, a cylinder fully contained within the housing and a handle for operation of the hydraulic system by the user and a lock bracket for insertion into the slots to contact the cylinder for even distribution of compression loads. In use, the user pumps the handle to actuate the hydraulic system and thereby adjust the loading dock to the desired height.

Preferably, the adjustable leg assembly includes a button on the lock bracket for securing the bracket in place during ramp movement. The lock bracket is tethered to the housing in both an inserted and uninserted position.

In highly preferred embodiments the housing has a top end and a bottom end. The top end is connected to a ramp portion of the loading dock and the bottom end is connected to a baseplate in contact with the ground when the dock is in a non-mobile position.

It is preferable that the relief valve is manually-actuated; actuation of the relief valve causes the loading dock to return to a resting position in contact with the ground. Actuation of the check valve locks the leg assembly into a desired position. Preferably, the hydraulic pump, relief valve, check valve and handle are adjacent to the housing.

It is highly preferable that the loading dock ramp member include a first upper-end planar portion, the plane of which is parallel to a ground surface on which the ramp member rests and a second planar portion, the plane of which is downwardly-angled from an upper end to a lower edge. It is also highly preferable that the ramp member includes two leg assemblies which are equally distant from a point on the lower edge.

To raise and lower the leg assembly, an elongate, adjustable housing in a resting position with incremental slots is provided as well as a hydraulic system having a hydraulic pump with a relief valve and check valve, a cylinder fully contained within the housing and a handle for operation of the hydraulic system by the user and a lock bracket for insertion into the slots to contact the cylinder for even distribution of compression loads. The user pumps the handle causing the cylinder to extend and the adjustable housing to elongate until the housing reaches a desired height. The user inserts the lock bracket into the corresponding slots. The lock bracket holds the cylinder in position and creates an even distribution of compression loads. Next, the user removes the lock bracket from the slots when use of the ramp member is complete. Finally, the user turns the relief valve causing the cylinder to compress under the weight of the ramp member and the ramp member to lower to a desired height.

Other highly preferred embodiments include a compression spring within the housing in place of a hydraulic system. Such preferred embodiments also include a baseplate with a flange for contact with the ground. In use, the user removes the bracket from the slots allowing the spring to compress which shortens the length of the adjustable housing allowing movement of the loading dock to a different location.

In operation, the compression spring embodiment includes providing an elongate, adjustable housing in a resting position; the housing includes incremental slots. Also provided is a compression spring within the housing, a lock bracket inserted into the slots to contact and hold the spring in place and a baseplate for contact with the ground. The user places their foot on the baseplate (specifically the flange portion) and removes the lock bracket from the slots causing the adjustable leg to shorten in length and to raise upward from the resting position. Next, the user removes their foot from the baseplate and moves the ramp member to the new, desired position. The user then places their foot back on the baseplate and pushes downward toward the ground and places the lock bracket into the slots when the leg assembly reaches the desired height.

BRIEF DESCRIPTION OF THE DRAWINGS

The drawings illustrate a preferred embodiment including the above-noted characteristics and features of the device. The device will be readily understood from the descriptions and drawings. In the drawings:

FIG. 1 is a perspective view of the mobile loading dock with adjustable leg assembly;

FIG. 2 is a front perspective view of the dock of FIG. 1;

DETAILED DESCRIPTION OF PREFERRED EMBODIMENTS

Figure 3:
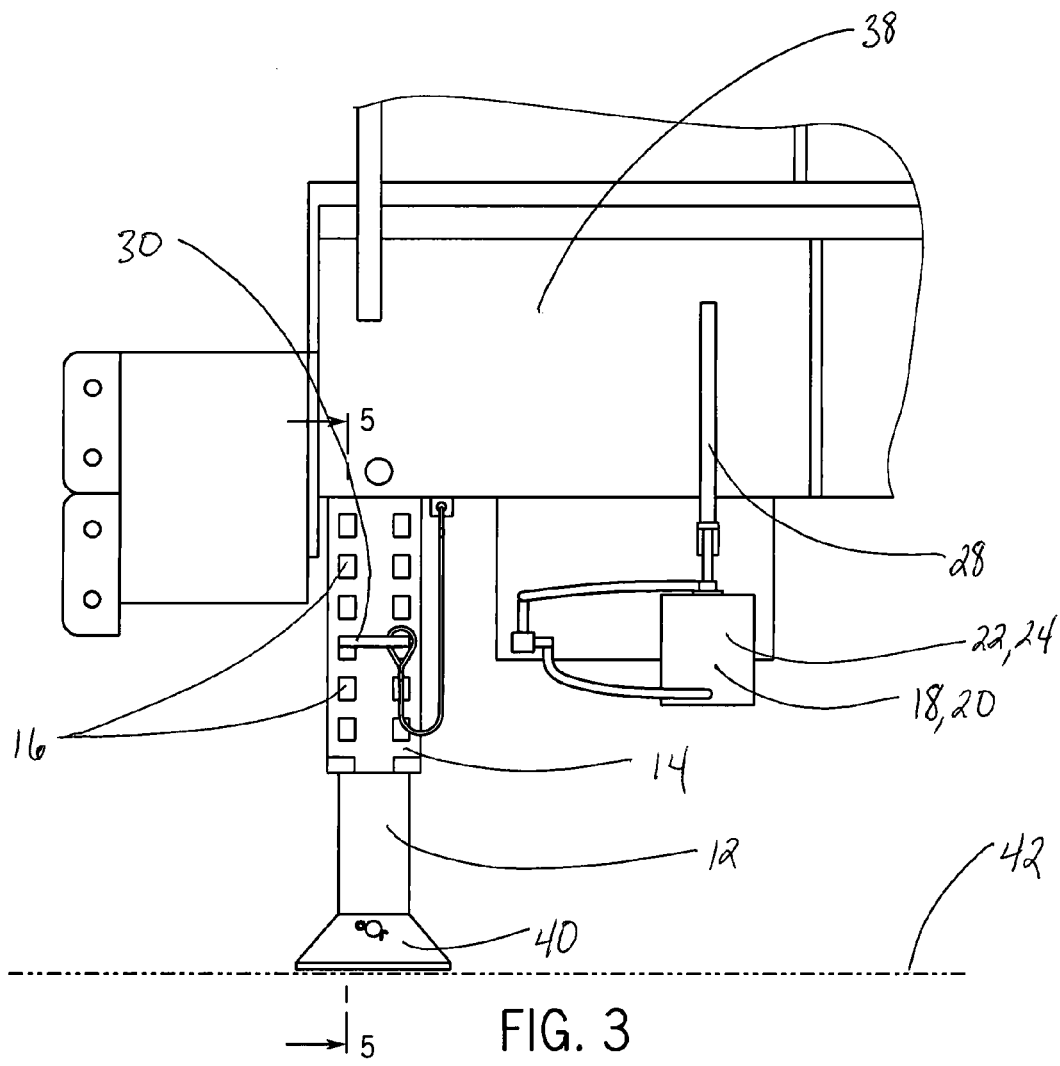
FIG. 3 is a sectional view of the adjustable leg assembly of FIG. 1 taken along line 3-3.
Figure 4:
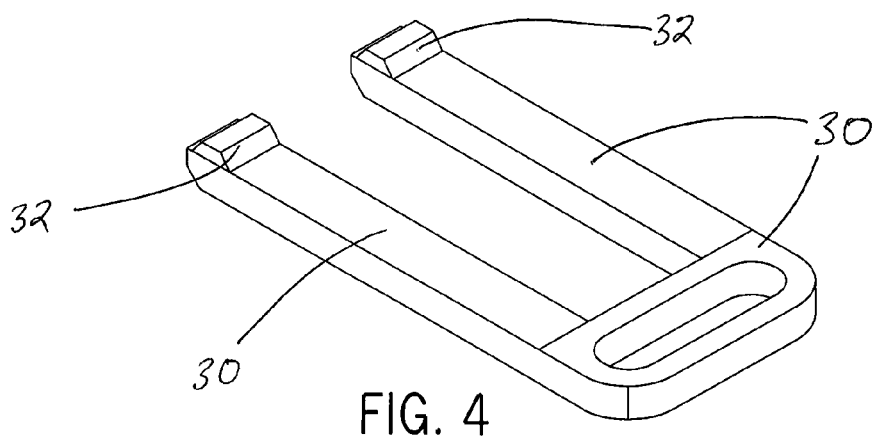
FIG. 4 is a perspective view of the lock bracket.
Figure 5:
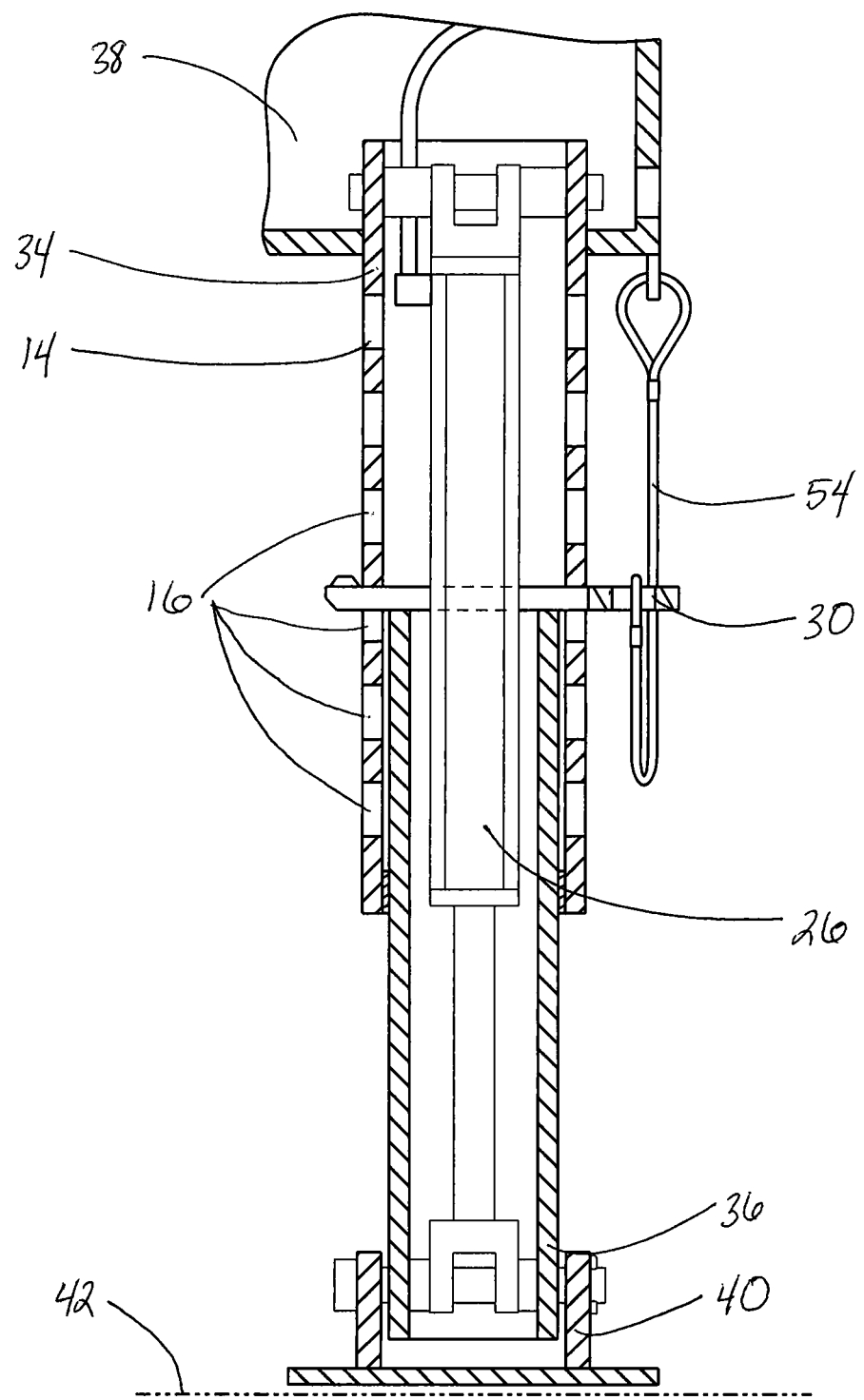
FIG. 5 is a cross-sectional view of the adjustable leg assembly of FIG. 3 taken along line 5-5 with a hydraulic cylinder.
Figure 6:
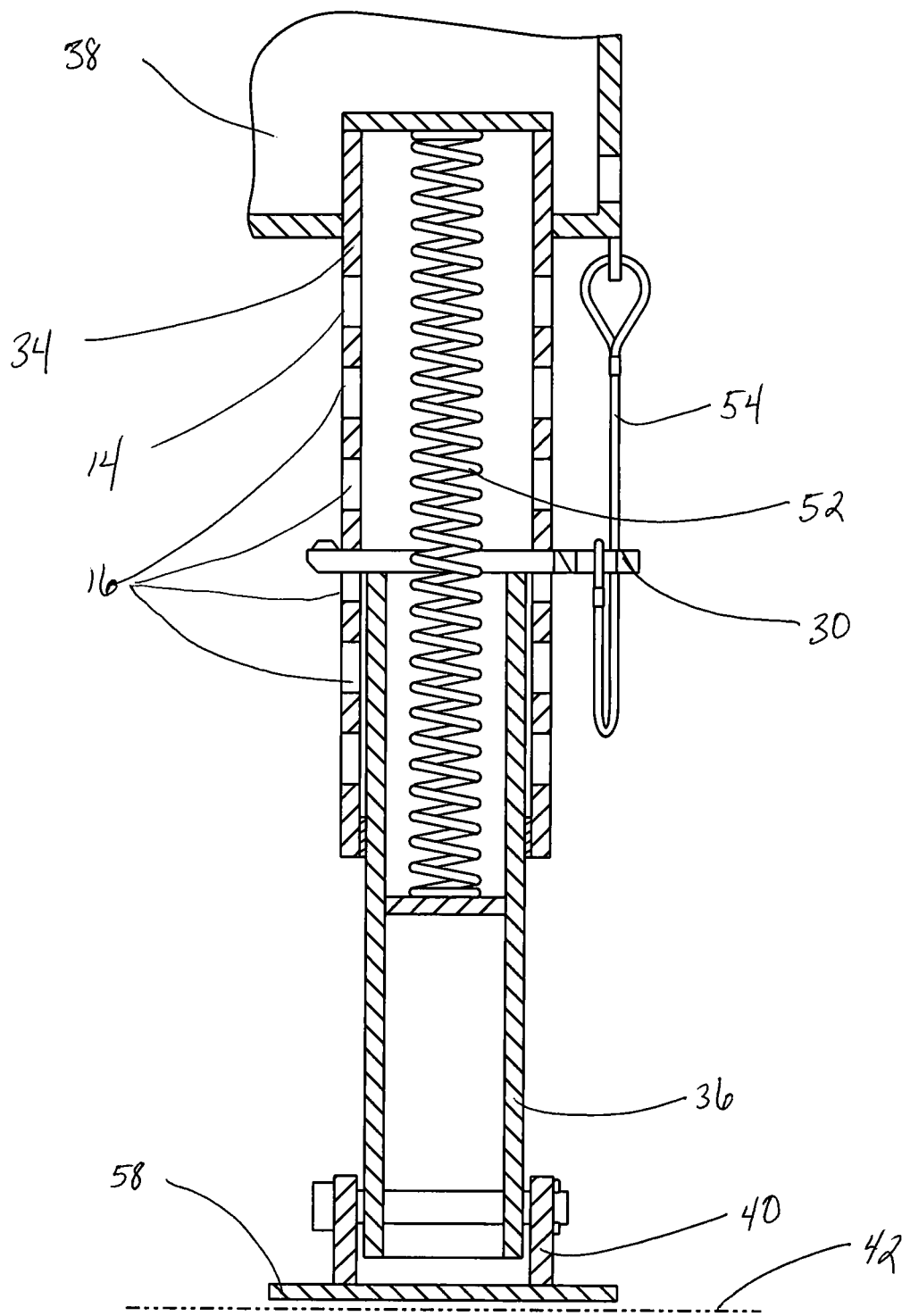
FIG. 6 is a cross-sectional view of the adjustable leg assembly with a compression spring.

FIGS. 1-6 illustrate a mobile loading dock 10 with adjustable leg assembly 12 with an elongate, adjustable housing 14 including incremental slots 16. FIGS. 1-5 illustrate one embodiment of the inventive device with a hydraulic system 18. FIGS. 1, 4 and 6 illustrate a second embodiment of the inventive device with a compression spring 52 in place of the hydraulic system 18.

FIG. 1 illustrates that adjustable leg assembly 12 also includes a hydraulic pump 20 with a relief valve 22 and check valve 24 as well as a hydraulic cylinder 26 fully contained within housing 14. Hydraulic system 18 includes a handle 28 for operation of the hydraulic system by a user.

FIG. 2 illustrates that loading dock 10 has two adjustable leg assemblies 12 that are preferably equidistant from each other and located on both sides of loading dock 10. Each adjustable leg assembly 12 is identical in shape and size to the other. FIGS. 1-2 show that leg assemblies 12 are equally distant from a point on the lower edge 50 of ramp 10. Such configuration allows for maximum dock stability.

FIG. 3 illustrates in more detail adjustable leg assembly 12 and the hydraulic system 18. FIG. 3 also illustrates handle 28 in more detail. A user pumps handle 28 to actuate hydraulic system 18 and thereby adjusts loading dock 10 to the desired height. As seen best in FIG. 3, hydraulic pump 20, relief valve 22, check valve 24 and handle 28 are adjacent to housing 14. Relief valve 22 is manually-actuated by user. Actuation of relief valve 22 causes loading dock 10 to return to a resting position in contact with ground 42. In contrast, actuation of check valve 24 locks leg assembly 12 into a desired position.

As seen best in FIGS. 4-5, a lock bracket 30 is inserted into slots 16 on housing 14 to contact cylinder 26 for even distribution of compression loads in the first embodiment of this device. In the second embodiment of this device, as seen in FIG. 6, bracket 30 is inserted into slots 16 on housing 14 to contact compression spring 52.

FIG. 4 shows that lock bracket 30 can be in a horse-shoe type configuration. Such configuration allows bracket 30 to easily engage with the corresponding slots 16 on housing 14. FIG. 4 also shows that bracket 30 includes at least one button 32 (and preferably two) for securing bracket 30 in place during ramp movement. A tether 54 connects lock bracket 30 to housing 14 as seen best in FIG. 3.

FIG. 6 illustrates the second embodiment of the device. In the second embodiment, a compression spring 52 is provided within housing 14 in place of the hydraulic system 18 seen in the first embodiment. The second embodiment also includes the components in the first embodiment, namely, the elongate, adjustable housing 14 with incremental slots 16, a lock bracket 30 for insertion into slots 16 and a baseplate 40 for contact with the ground 42. Baseplate 40 includes a flange 58 for placement of user's foot during operation.

As seen in FIG. 6, lock bracket 30 when inserted into slots 16 contacts and holds spring 52 in place. In operation, a user removes bracket 30 from slots 16 allowing spring 52 to compress which shortens the length of the adjustable housing 14 allowing movement of loading dock 10 to a different location.

Dock 10 includes a ramp portion 38 as seen best in FIG. 1. Housing 14 has a top end 34 connected to ramp portion 38 and a bottom end 36 connected to a baseplate 40 in contact with the ground 42 when dock 10 is in a non-mobile position. Dock 10 has opposed sidewalls 52 that extend the majority of the length of ramp portion 38 as seen in FIG. 1.

FIG. 1 also shows that dock 10 includes a first upper-end planar portion 44, the plane of which is parallel to a ground surface 42 on which dock 10 rests. Dock 10 also includes a second planar portion 46, the plane of which is downwardly-angled from an upper end 48 to a lower edge 50.

Some embodiments of dock 10 also include a hand-rail 62 secured to first upper-end planar portion 44 as seen in FIG. 1. First upper-end planar portion 44 is the section of dock 10 which, when in use, abuts either a stationary loading dock on a building or vehicle for purposes of loading or unloading.

Typically stationary building loading docks include a raised dock for the loading and unloading of materials which often come in large quantities and are carried by wooden pallets. Most docks have doorways with overhead doors that provide access to a garage, warehouse or similar type of building.

FIG. 1-6 also illustrate that dock 10 includes an adjustable leg assembly 12 which is superior to docks with stationary support members. Such stationary support members generally do not easily articulate if at all and are typically landing craft gear. A manual hand crank is traditionally used to raise or lower the height of the stationary support members, this can be both cumbersome and time consuming.

The first embodiment as shown in FIGS. 1-5 is the hydraulic system 18 embodiment. The method for this embodiment includes the following steps. To raise or lower adjustable leg 12, an elongate, adjustable housing 14 in a resting position is provided. Handle 28 is pumped by user which causes the cylinder 26 to extend and the adjustable housing 14 to elongate until the housing 14 reaches a desired height. A user then inserts the lock bracket 30 into slots 16. The lock bracket 30 holds the cylinder 26 in position and creates an even distribution of compression loads. The user then removes the lock bracket 30 from slots 16 when use of the ramp member 10 is complete. Next, a user turns the relief valve 22 causing the cylinder 26 to compress under the weight of the ramp member 10 and the ramp member 10 to lower to a desired height.

The second embodiment as shown in FIGS. 1-4 and 6 is the compression spring 52 embodiment. The method for this embodiment includes the following steps. To raise or lower adjustable leg 12, an elongate, adjustable housing 14 in a resting position is provided. First, user places their foot on the flange 58 portion of baseplate 40 and removes the lock bracket 30 from slots 16 causing the adjustable leg 12 to shorten in length and to raise upward from the resting position. Next, user removes their foot from the flange 58 and moves the ramp member 10 to the new, desired position. Finally, the user places their foot back on the flange 58 portion of baseplate 40 and pushes downward toward the ground 42. When the leg assembly 12 reaches the desired height the user places the lock bracket 30 back into slots 16 to secure the spring 58 and leg assembly 12 in place.

A wide variety of materials are available for the various parts discussed and illustrated herein. Although the device has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. An adjustable leg assembly for a loading dock ramp member comprising:
   an elongate, adjustable housing including incremental slots, the housing having a top end and a bottom end, the top end connected to a planar ramp portion of the loading dock and the bottom end connected to a baseplate in contact with the ground when the dock is in a non-mobile position;
   a hydraulic system having a hydraulic pump with a relief valve and a check valve, a cylinder fully contained within the housing and a handle for operation of the hydraulic system by the user; and
   a lock bracket for insertion into the slots to contact the cylinder for even distribution of compression loads;
   the loading dock ramp member including (a) a first upper-end planar portion, the plane of which is parallel to a ground surface on which the ramp member rests; and (b) a second planar portion, the plane of which is downwardly-angled from an upper end to a lower edge, whereby the user pumps the handle to actuate the hydraulic system and thereby adjust the loading dock to the desired height.

2. The leg assembly of claim 1 further including a button on the lock bracket for securing the bracket in place during ramp movement.

3. The leg assembly of claim 1 wherein the relief valve is manually-actuated, actuation of the relief valve causes the loading dock to return to a resting position in contact with the ground.

4. The leg assembly of claim 1 wherein actuation of the check valve locks the leg assembly into a desired position.

5. The leg assembly of claim 1 wherein the hydraulic pump, relief valve, check valve and handle are adjacent to the housing.

6. The leg assembly of claim 1 wherein the ramp member includes two leg assemblies, the leg assemblies being equally distant from a point on the lower edge.

7. The leg assembly of claim 1 further including a tether, the tether being connected to the lock bracket and housing.

8. A method of raising and lowering an adjustable leg assembly for a loading dock ramp member the method comprising:
   providing (a) an elongate, adjustable housing in a resting position, the housing including incremental slots and having a top end and a bottom end, the top end connected to a planar ramp portion of the loading dock and the bottom end connected to a baseplate in contact with the ground when the dock is in a non-mobile position; (b) a hydraulic system having a hydraulic pump with a relief valve and check valve, a cylinder fully contained within the housing and a handle for operation of the hydraulic system by the user; and (c) a lock bracket for insertion into the slots to contact the cylinder for even distribution of compression loads;
   providing a loading dock ramp member with a first upper-end planar portion, the plane of which is parallel to a ground surface on which the ramp member rests and a second planar portion, the plane of which is downwardly-angled from an upper end to a lower edge;
   pumping the handle thereby causing the cylinder to extend and the adjustable housing to elongate until the housing reaches a desired height;
   inserting the lock bracket into slots, the lock bracket holding the cylinder in position and creating an even distribution of compression loads;
   removing the lock bracket from the slots when use of the ramp member is complete;
   turning the relief valve causing the cylinder to compress under the weight of the ramp member and the ramp member to lower to a desired height.

* * * * *